(12) United States Patent
Hamano (10) Patent No.: US 11,794,655 B2
(45) Date of Patent: Oct. 24, 2023

(54) ON-VEHICLE INFORMATION DISPLAY DEVICE

(71) Applicant: MAZDA MOTOR CORPORATION, Hiroshima (JP)

(72) Inventor: Daisuke Hamano, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 118 days.

(21) Appl. No.: 17/610,698

(22) PCT Filed: Mar. 16, 2020

(86) PCT No.: PCT/JP2020/011406
§ 371 (c)(1),
(2) Date: Nov. 12, 2021

(87) PCT Pub. No.: WO2020/250525
PCT Pub. Date: Dec. 17, 2020

(65) Prior Publication Data
US 2022/0242316 A1  Aug. 4, 2022

(30) Foreign Application Priority Data
Jun. 14, 2019 (JP) ................................. 2019-111102

(51) Int. Cl.
*B60R 1/20* (2022.01)
*G06V 20/56* (2022.01)
(Continued)

(52) U.S. Cl.
CPC ............... *B60R 1/20* (2022.01); *G06V 20/56* (2022.01); *G08G 1/168* (2013.01); *H04N 5/268* (2013.01);
(Continued)

(58) Field of Classification Search
None
See application file for complete search history.

(56) References Cited

U.S. PATENT DOCUMENTS

2006/0215020 A1* 9/2006 Mori ..................... B60R 1/00
348/148
2012/0143468 A1* 6/2012 Kim ................... F02N 11/0837
701/102
(Continued)

FOREIGN PATENT DOCUMENTS

JP  2000-207696 A  7/2000
JP  2007-249103 A  9/2007
(Continued)

OTHER PUBLICATIONS

International Search Report and Written Opinion dated May 26, 2020, received for PCT Application PCT/JP2020/011406, Filed on Mar. 16, 2020, 11 pages including English Translation.

*Primary Examiner* — Rebecca A Volentine
(74) *Attorney, Agent, or Firm* — XSENSUS LLP (57) ABSTRACT

A vehicle information display device 100 includes: an environment determination unit (115) that predicts an occurrence of a backward movement of a vehicle based on an output from an environment information acquisition unit, an image processing unit (121) that receives an image captured by a camera and generates an image to be displayed on a display screen, and a display switching unit that switches a display of a monitor screen provided in a vehicle in accordance with a traveling status of the vehicle. When the environment determination unit (115) predicts an occurrence of a backward movement, the image processing unit (121) starts image processing for the backward movement in advance, and When the user performs the backward move-
(Continued)

ment operation, the output image from the image processing unit is displayed on the display screen.

6 Claims, 5 Drawing Sheets

(51) Int. Cl.
  *G08G 1/16* (2006.01)
  *H04N 5/268* (2006.01)
  *H04N 7/18* (2006.01)
  *G06V 20/59* (2022.01)
  *H04N 23/90* (2023.01)
(52) U.S. Cl.
  CPC ............ *H04N 7/183* (2013.01); *H04N 7/188* (2013.01); *B60R 2300/105* (2013.01); *B60R 2300/20* (2013.01); *B60R 2300/30* (2013.01); *B60R 2300/806* (2013.01); *G06V 20/597* (2022.01); *H04N 23/90* (2023.01)

(56) References Cited

U.S. PATENT DOCUMENTS

| | | | |
|---|---|---|---|
| 2017/0163863 | A1 | 6/2017 | Gomez Timoneda et al. |
| 2017/0246991 | A1* | 8/2017 | Harter .................. H04N 23/634 |
| 2020/0278743 | A1* | 9/2020 | Hiroki ...................... G07C 5/02 |
| 2021/0400241 | A1* | 12/2021 | Yamanaka ........... H04N 25/445 |

FOREIGN PATENT DOCUMENTS

| | | |
|---|---|---|
| JP | 2008-24230 A | 2/2008 |
| JP | 2009-78746 A | 4/2009 |
| JP | 2009-205191 A | 9/2009 |
| JP | 2009-206354 A | 9/2009 |
| JP | 2010-59820 A | 3/2010 |
| JP | 2010-195168 A | 9/2010 |
| JP | 2011-25895 A | 2/2011 |
| JP | 2011-182254 A | 9/2011 |
| JP | 2013-117472 A | 6/2013 |
| JP | 2018-155079 A | 10/2018 |

* cited by examiner

ON-VEHICLE INFORMATION DISPLAY DEVICE

CROSS-REFERENCE TO RELATED APPLICATIONS

The present application is based on PCT filing PCT/JP2020/011406, filed Mar. 16, 2020, which claims priority to JP 2019-111102, filed Jun. 14, 2019, the entire contents of each are incorporated herein by reference.

TECHNICAL FIELD

The present disclosure belongs to a technical field related to an information display device used in a vehicle.

BACKGROUND

In recent years, many drive-assisting devices have been mounted on a vehicle, which has resulted in an increase in dark current. In order to reduce this dark current, a power supply of each device in the vehicle is desirably shut off when the device is not in use. On the other hand, a time required for activation of each device is desirably shortened as much as possible.

Patent Document 1 discloses a technique that shortens the time required for activation of an on-board display device when a parked vehicle is driven to leave. Specifically, in the technique of Patent Document 1, for necessity to drive a vehicle backward to leave, when a user turns off the power, a volatile memory backup means executes a backup operation.

CITATION LIST

Patent Document

Patent Document 1: Japanese Unexamined Patent Publication No. 2013-117472

SUMMARY

Technical Problem

The technique of Patent Document 1 relates to the time required for activation of the display device at the time when a parked vehicle is driven to leave, but there are functions whose time required for the activation is desirably shortened at the time other than the time when the vehicle is driven to leave. For example, some vehicles include a configuration that activates a rear-view camera before the vehicle is driven backward after entering a parking lot. The time required for activation of the rear-view camera is desirably shortened to a predetermined time or less, and thus dedicated software or hardware has been used to shorten the time required for the activation. However, using the dedicated software or hardware involves time and effort for designing and causes an increase in cost.

The technique disclosed herein was made in view of the above problem, and an object thereof is to promptly display an image captured by the camera when a vehicle in operation is about to be driven backward.

SUMMARY

In order to achieve the objective, an aspect of the technique disclosed herein is directed to a vehicle information display device that displays, on an in-vehicle display, an image of an outside area behind a vehicle captured by a rear-view camera. The vehicle information display device includes: an image processing unit that receives data of the image captured by the rear-view camera and performs predetermined image processing on the data of the image; a display switching unit that switches a display of a monitor screen provided in a vehicle, in accordance with an output from a driving operation information unit that detects a position of a shift lever; and an environment determination unit that predicts an occurrence of a backward movement of the vehicle, based on one or more of an output from a front-view camera that captures an image of an outside area ahead of the vehicle, an output from a vehicle speed sensor, and an output from an in-vehicle camera that captures an image of a driver. When the environment determination unit predicts an occurrence of a backward movement of the vehicle, the rear-view camera is switched from a stopped state to an activated state, and the image processing unit starts the predetermined image processing on the data of the image received from the rear-view camera in the activated state. When the display switching unit receives, from the driving operation information unit, a movement signal indicating that the shift lever has been moved to a reverse position, the display switching unit switches the display of the monitor screen provided in the vehicle to an output image from the image processing unit.

In this configuration, when an occurrence of a backward movement is predicted, the image processing unit starts processing for the backward movement in advance. This allows the output image from the image processing unit to be promptly displayed on the display when the user performs a backward movement operation. Further, it is not necessary to use hardware and software specialized in a function of increasing the speed of the processing, which makes it possible to prevent an increase in cost.

In the external environment recognition device, the environment determination unit may be configured to predict an occurrence of a backward movement of the vehicle when recognizing entering of the vehicle into a parking lot based on an output from an external environment recognition unit including the front-view camera.

This configuration enables an operation based on the prediction of the occurrence of the backward movement of the vehicle to be started at a relatively early stage.

Another aspect of the technique disclosed herein is directed to a vehicle information display device including: an image processing unit that receives data of an image captured by a rear-view camera that captures the image of an outside area behind a vehicle, and performs predetermined image processing on the data of the image; an environment determination unit that predicts an occurrence of a backward movement of the vehicle, based on one or more of an output from a front-view camera that captures an image of an outside area ahead of the vehicle, an output from a vehicle speed sensor, and an output from an in-vehicle camera that captures an image of a driver. When the environment determination unit predicts an occurrence of a backward movement of the vehicle, a setting of the rear-view camera is changed from a rear monitoring setting for monitoring a rear of the vehicle during normal traveling of the vehicle to a backward movement setting having a high-definition imaging distance shorter than that of the rear monitoring setting.

Here, a "device" described herein includes devices such as an actuator and a sensor that are controlled during traveling of the motor vehicle.

In this configuration, when an occurrence of a backward movement is predicted, the setting of the rear-view camera is changed from the rear monitoring setting to the backward movement setting. This allows prompt switching of the display to the output image from the image processing unit when the user performs a backward movement operation. Further, it is not necessary to use hardware and software specialized in a function of increasing the speed of the processing, which makes it possible to prevent an increase in cost.

Advantages

As can be seen in the foregoing, when an occurrence of a backward movement is predicted, the image processing unit starts processing for the backward movement in advance. This allows the output image from the image processing unit to be promptly displayed on the display screen when the user performs a backward movement operation.

DESCRIPTION OF EMBODIMENT

An exemplary embodiment will now be described in detail with reference to the drawings.

Figure 1:
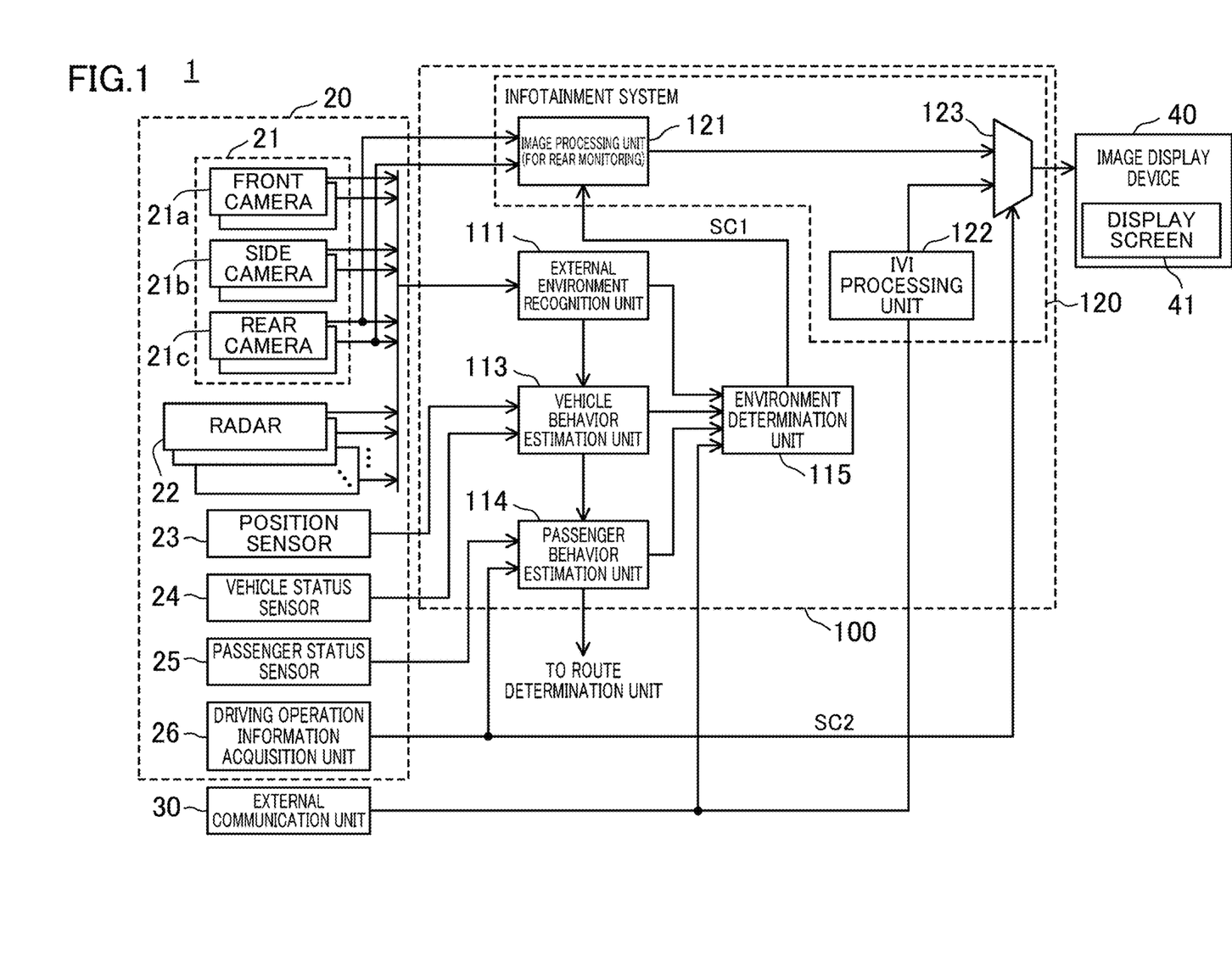
FIG. 1 is a block diagram illustrating a configuration of a vehicle information display device.
Figure 2:
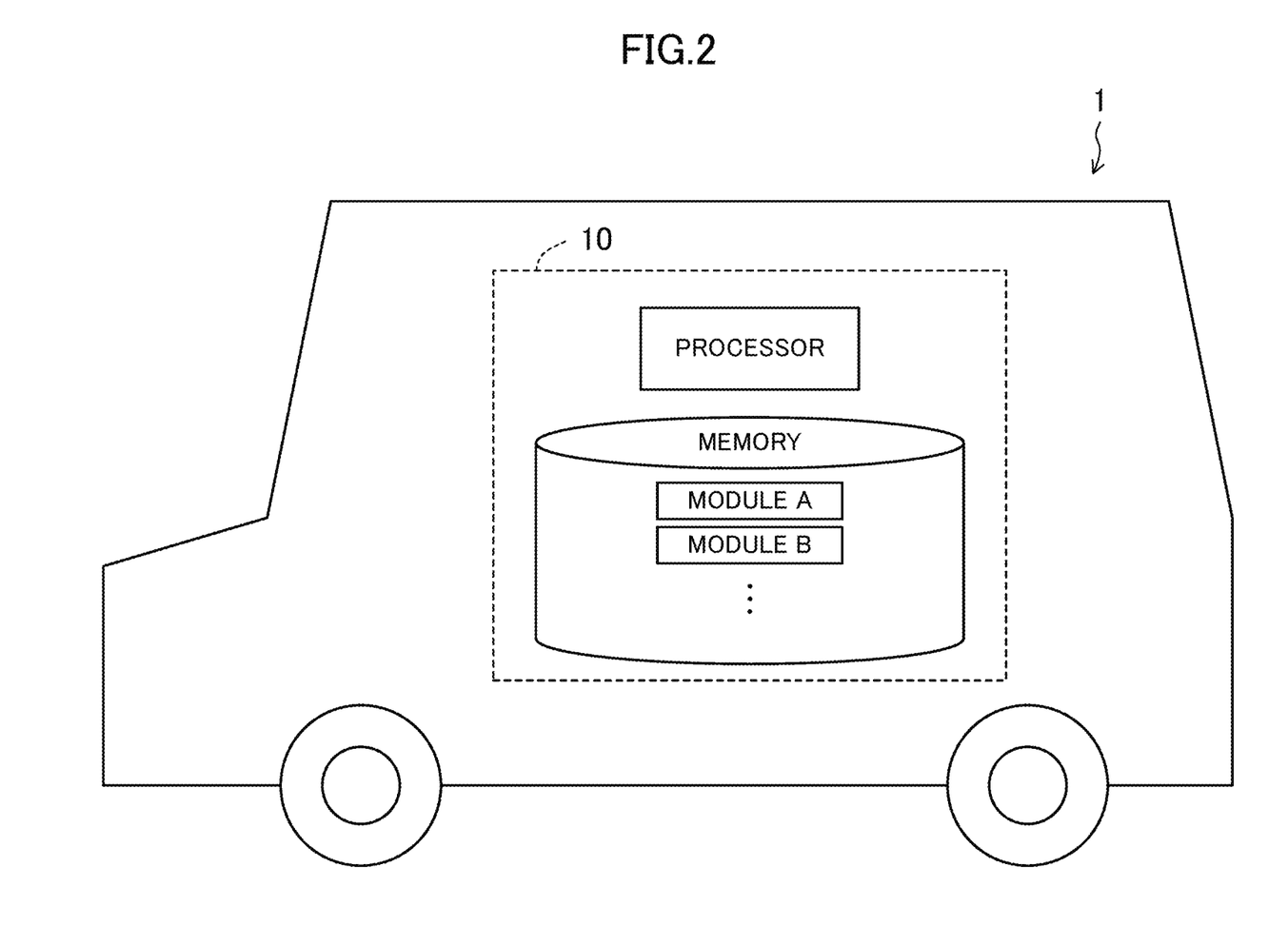
FIG. 2 is a schematic view of a vehicle having the vehicle information display device mounted thereon.

FIG. 1 is a block diagram illustrating a configuration of a vehicle information display device according to the embodiment. FIG. 2 is a schematic view of a vehicle having the vehicle information display device according to the embodiment mounted thereon. Note that FIG. 1 illustrates a configuration to exhibit a function as the information display device of the embodiment, and does not illustrate all functions relating to information display for a vehicle.

A vehicle 1 includes an arithmetic unit that controls an operation of the vehicle 1. The arithmetic unit 10 is a microprocessor configured by one or more chips, and includes a CPU, a memory, and the like. The arithmetic unit 10 includes, for example, a configuration for achieving functions of the vehicle information display device 100, which will be described below. In the example configuration illustrated in FIG. 2, the arithmetic unit 10 includes a processor and a memory. The memory stores modules each of which is software executable by the processor. The functions of units of the vehicle information display device 100 shown in FIG. 1 are achieved, for example, by the processor executing the modules stored in the memory. In addition, the memory stores data of a model used by the arithmetic unit 10. Note that a plurality of processors and a plurality of memories may be provided. Part of the function of each unit of the vehicle information display device 100 shown in FIG. 1 may be achieved by a hardware circuit. The same applies to FIG. 4, which will be described later. The functions of units of a vehicle control device 130 are achieved, for example, by the processor executing the modules stored in the memory.

The vehicle information display device 100 includes an infotainment system 120 that displays, for example, route guide information and road traffic information from a car navigation system, and image information from a rear-view camera during the backward movement, and other information, on a display screen 41 of an image display device 40 provided in the vehicle. In the following description, for convenience of explanation, information displayed on the display screen 41 of the image display device 40 will be collectively referred to simply as "display information." The image display device 40 is an example of a display.

The infotainment system 120 includes an image processing unit 121 that performs processing on rear monitoring images among images taken by cameras 21, an in-vehicle infotainment (IVI) processing unit 122 that functions to perform display processing on external information received by an external communication unit 30, and a selector 123 that selects either one of an output from the image processing unit 121 or an output from the IVI processing unit 122, and outputs the selected output to the image display device 40.

A sensor device 20 includes: (1) a plurality of cameras 21 that are provided to the body or the like of the vehicle 1 and that take images of the vehicle's external environment; (2) a plurality of radars 22 that are provided to the body or the like of the vehicle 1 and that detect targets and the like outside the vehicle 1; (3) a position sensor 23 that detects the position of the vehicle 1 (vehicle position information) by using a Global Positioning System (GPS); (4) a vehicle status sensor 24 that acquires a status of the vehicle 1 and that includes outputs from sensors that detect the behavior of the vehicle, such as a vehicle speed sensor, an acceleration sensor, and a yaw rate sensor; (5) an occupant status sensor 25 that is comprised of an in-vehicle camera or the like and that acquires a status of an occupant of the vehicle 1; and (6) a driving operation information acquisition unit 26 for detecting the driving operation of the driver. The driving operation information acquisition unit 26 includes an accelerator position sensor, a shift sensor that detects a position of a shift lever, a brake sensor, and a steering angle sensor. The driving operation information acquisition unit 26 outputs an output switching signal SC2 based on the output from the shift sensor. The signal format of the output switching signal SC2 is not particularly limited. In the present embodiment, the driving operation information acquisition unit 26 outputs "High" when the driver shifts the shift lever to an "R range," and outputs "Low" when the driver shifts the shift lever to a range other than the "R range."

The cameras 21 include a front-view camera 21a that captures an image of an outside area ahead of the vehicle, a side-view camera 21b that captures an image of an outside area on the sides of the vehicle, and a rear-view camera 21c that is used for parking and that captures an image of an outside area behind the vehicle during parking. The rear-view camera 21c for parking is a camera used at the time of parking. In the present embodiment, the rear-view camera 21c is not being activated during so-called normal driving, such as traveling on an ordinary road or an expressway, in order to reduce power consumption. In addition to the rear-view camera 21c for parking, the cameras 21 may include a rear-view camera that performs an operation during normal driving of the vehicle and monitors the rear of the vehicle.

The external communication unit 30 is connected to a network outside the vehicle. Communication information from another vehicle (other vehicles) positioned around the subject vehicle or traffic information from a navigation system is input into the external communication unit 30. Hereinafter, for convenience of description, information received from the external network via the external communication unit 30 is collectively referred to as "external information." The sensor device 20 and the external communication unit 30 are examples of the environment information acquisition unit.

The image processing unit 121 is not being activated during the so-called normal driving, such as traveling on an ordinary road or an expressway, in order to reduce power consumption. The image processing unit 121 is activated when a prediction signal SC1 indicating that an occurrence of a backward movement of the vehicle 1 is predicted is received from an environment determination unit 115, for example. The image processing unit 121 receives an image signal of the image taken by the rear-view camera 21*c* for parking, generates an image to be displayed on the display screen 41 of the image display device 40, and outputs the image.

The environment determination unit 115 receives information on the vehicle's external environment from an external environment recognition unit 111 that recognizes the vehicle exterior environment, information on estimation of the vehicle's behavior from a vehicle behavior estimation unit 113, and information on estimation of the occupant's behavior from an occupant behavior estimation unit 114, and determines a situation the vehicle is in (hereinafter, referred to as "vehicle situation"), including a traveling scene of the vehicle, the vehicle's external environment, the in-vehicle environment, a status of the occupant, and the like. In particular, in the present embodiment, the environment determination unit 115 predicts, as the vehicle situation, an occurrence of a backward movement of the vehicle 1. For example, the environment determination unit 115 determines a situation in which the vehicle 1 is likely to move backward after a short period of time has passed, that is, in the near future. How to predict and determine the backward movement is not particularly limited. For example, when the vehicle 1 has entered a parking lot, the environment determination unit 115 determines that the vehicle 1 is likely to move backward based on the information on the vehicle's external environment. Further, when the environment determination unit 115 detects that the vehicle 1 has slowed down, approached a shoulder of the road, and briefly stopped, and then the occupant has looked behind, the environment determination unit 115 determines that the vehicle 1 is likely to move backward based on the information on the vehicle's external environment, information on estimation of the vehicle behavior, and information on estimation of the occupant's behavior.

The IVI processing unit 122 receives map information from a car navigation device in the vehicle, and route guide information, road traffic information, and entertainment information such as terrestrial broadcast, as external information from an external network via the external communication unit 30. Then, based on setting information set by the occupant and control information of the remote controller or the like, content information for displaying the content that matches the occupant's desire is output. Among the configurations and functions of the IVI processing unit 122, those for exhibiting the functions according to the present embodiment are exemplified herein. Not all the configurations and functions of the IVI processing unit 122 are described.

The selector 123 receives an image captured by the rear-view camera 21*c* and generated in the image processing unit 121, and the content information output from the IVI processing unit 122. The selector 123 then outputs either one of the image captured by the rear-view camera 21*c* or the content information output from the IVI processing unit 122, based on the output switching signal SC2 from the driving operation information acquisition unit 26. Specifically, when the driver does not shift the shift lever to the "R range", the selector 123 selects the output from the IVI processing unit 122, and when the driver shifts the shift lever to the "R range", the selector 123 selects the output from the image processing unit 121 and outputs it to the image display device 40. The information selected by the selector 123 is displayed on the display screen 41 of the image display device 40.

Figure 3:
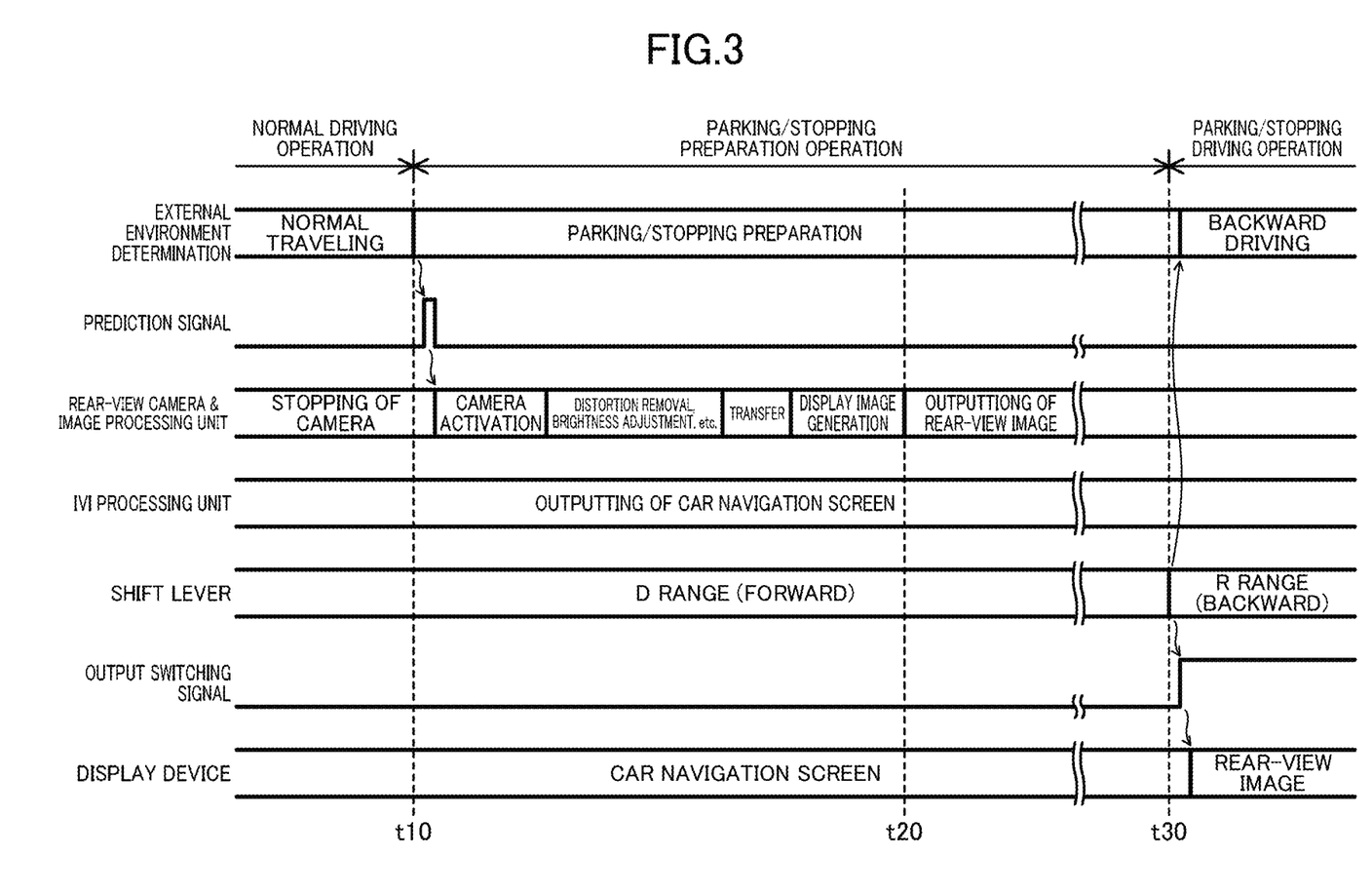
FIG. 3 is a timing chart showing an operation of the vehicle information display device.

FIG. 3 is a timing chart illustrating an operation of the vehicle information display device of FIG. 1. In FIG. 3, suppose that after normal traveling of the vehicle 1 on an ordinary road, the vehicle 1 enters a parking lot at a time t10 and the driver shifts the shift lever to the "R range" at a time t30. Then, the vehicle 1 moves backward. Further, suppose that the prediction signal SC1 is high-active.

In the period before the time t10 in FIG. 3, the vehicle 1 is traveling normally, and the content information output from the IVI processing unit 122 is displayed on the image display device 40 just like an image of car navigation.

When the vehicle 1 enters a parking lot at the time t10 in FIG. 3, the external environment recognition unit 111 recognizes entering of the vehicle 1 into the parking lot and transmits the recognition results to the environment determination unit 115.

When entering of the vehicle 1 into the parking lot is recognized, the environment determination unit 115 sets the prediction signal SC1 to "High" based on the recognition results from the external environment recognition unit 111. Then, the rear-view camera 21*c* and the image processing unit 121 are activated. Then, activation processing and the image processing unit 121 are executed in the rear-view camera 21*c*. Any one of the modules (e.g., the environment determination unit 115 or the image processing unit 121) illustrated in FIG. 1 may be set to activate the rear-view camera 21*c*, or a dedicated module (not illustrated) may be provided for activating the rear-view camera 21*c* after the environment determination unit 115 has recognized prediction of an occurrence of a backward movement of the vehicle. The prediction of an occurrence of a backward movement of the vehicle may be recognized by recognizing a brief stop of the vehicle based on the output from the vehicle status sensor 24 (e.g., a vehicle speed sensor) and recognizing, after the brief stop of the vehicle, a motion of the driver looking behind by the occupant status sensor 25 (e.g., an in-vehicle camera). The motion of the driver looking behind includes a motion of the driver turning around to look behind. The occurrence of the backward movement of the vehicle is predicted in a similar way in the case in which the setting of the rear-view camera 21*c* is changed from the rear monitoring setting to the backward movement setting, which will be described later.

For example, after the rear-view camera 21*c* is activated, reset processing is performed on various components such as a microcomputer, and imaging starts. Thereafter, distortion removal, brightness adjustment, and the like are performed in the rear-view camera 21*c*, and the image signal is output from the rear-view camera 21c (referred to as "transfer" in FIG. 3). Similar to the rear-view camera 21c, the reset processing is performed on the software and the hardware in the image processing unit 121. When the reset processing ends, processing to generate a display image is executed (see the time t10 and the time t20 in FIG. 3). The processing to generate a display image is an example of predetermined image processing.

Then, when the image signal is output from the rear-view camera 21c in the state in which preparation for image processing is completed, the images captured by the rear-view camera 21c are sequentially output to the selector 123 (see the time t20 in FIG. 3). The period between the time t10 and the time t20 varies depending on the processing speed of the arithmetic unit 10, the time required for activation of the rear-view camera 21c, and the like. However, it takes approximately several seconds if an activation circuit and the like are configured by general-purpose electronic components, without using a dedicated circuit. Here, even after the time t20 has passed, the content information output from the IVI processing unit 122 is continuously displayed while the vehicle is searching for a parking space, that is, while the shift lever is in a "D range".

At the time t30, when the driver decides on where to park and shifts the shift lever to the "R range", the output switching signal SC2 from the driving operation information acquisition unit 26 is switched from "Low" to "High," Then, the output signal from the selector 123 is switched from the output signal of the IVI processing unit 122 to the image captured by the rear-view camera 21c.

In summary, the vehicle information display device 100 of the present embodiment includes the environment determination unit 115 that predicts an occurrence of the backward movement based on the output from the sensor device 20 that acquires the environment information of at least either one of the inside of the vehicle 1 or the outside of the vehicle 1, and the image processing unit 121 that receives the image signals from the cameras 21 and generates an image to be displayed on the display screen 41 of the image display device 40. If the environment determination unit 115 predicts an occurrence of a backward movement, the camera for the backward movement is activated in advance, and the image processing unit 121 starts processing. When the user performs the backward movement operation, the output image from the image processing unit 121 is displayed on the display screen.

In this way, when the environment determination unit 115 predicts an occurrence of a backward movement, the camera is activated in advance, and the image processing unit 121 starts the processing. In other words, preparation for displaying the output image from the image processing unit 121 on the display screen is performed in advance. Thus, when the user performs the backward movement operation, the output image can be promptly displayed. As a result, it is possible to significantly shorten the time until the image is displayed on the display screen 41, as compared with the case in which the camera is activated and the image processing unit 121 starts the processing after the user performs the backward movement operation. Further, it is possible to secure a sufficient time until the camera is activated and the image processing unit 121 starts the processing. Thus, it is not necessary to use hardware or software specialized in increasing the speed of the processing, which makes it possible to prevent an increase in cost.

In the above-described embodiment, the rear-view camera 21c is not being activated, but the present invention is not limited thereto. For example, when the rear-view camera 21c for parking is also used as a camera for rear monitoring during driving the vehicle, the rear-view camera 21c is in an activated state even during normal traveling. Also in this case, the technique of the present disclosure may be applied. Specifically, a setting of the camera as a rear monitoring camera and a setting of the camera as a rear-view camera for parking may be different from each other, in settings such as the width of the angle of view, the imaging distance for improving the accuracy, and the like. In this case, as in the above-described embodiment, the vehicle information display device 100 may change the setting of the rear-view camera 21c from the setting as the rear monitoring camera (hereinafter referred to as the "rear monitoring setting") to the setting as the rear-view camera for parking (hereinafter referred to as the "backward movement setting") when the environment determination unit 115 predicts an occurrence of a backward movement of the vehicle. The setting of the rear-view camera 21c may be changed from the rear monitoring setting to the backward movement setting by any one of the modules (e.g., the environment determination unit 115 or the image processing unit 121) illustrated in FIG. 1, or a dedicated module (not illustrated) may be provided for changing the setting of the rear-view camera 21c from the rear monitoring setting to the backward movement setting when the environment determination unit 115 recognizes prediction of an occurrence of a backward movement. The change of the setting of the rear-view camera includes, for example, a change of a parameter such as a dynamic range, brightness of the camera, and resolution of the camera.

It is presumed that the speed of the vehicle is low when the environment determination unit 115 predicts an occurrence of a backward movement of the vehicle. Therefore, even if the setting of the camera is changed in advance, the influence of the change is slight. For example, using results from other sensors (e.g., radars) may prevent the influence of the change in the setting of the camera.

If the vehicle 1 returns to the normal traveling state without backward movement after prediction of an occurrence of a backward movement, the rear-view camera 21c may return to the state that is the same as the state in the normal traveling. In particular, the rear-view camera 21c returns to a non-activated state, for example.

Figure 4:
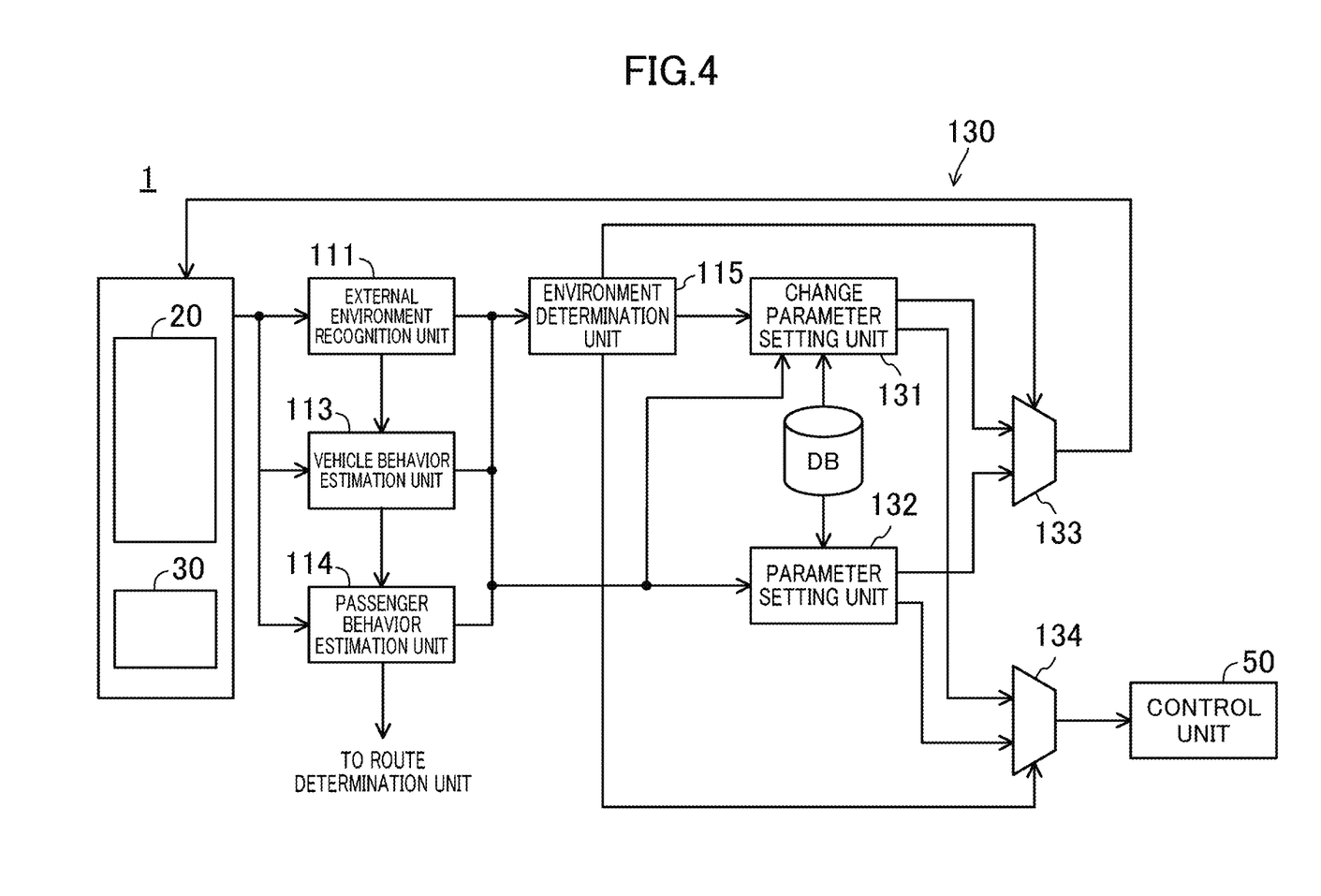
FIG. 4 is a block diagram illustrating a configuration of a device according to a variation.
Figure 5:
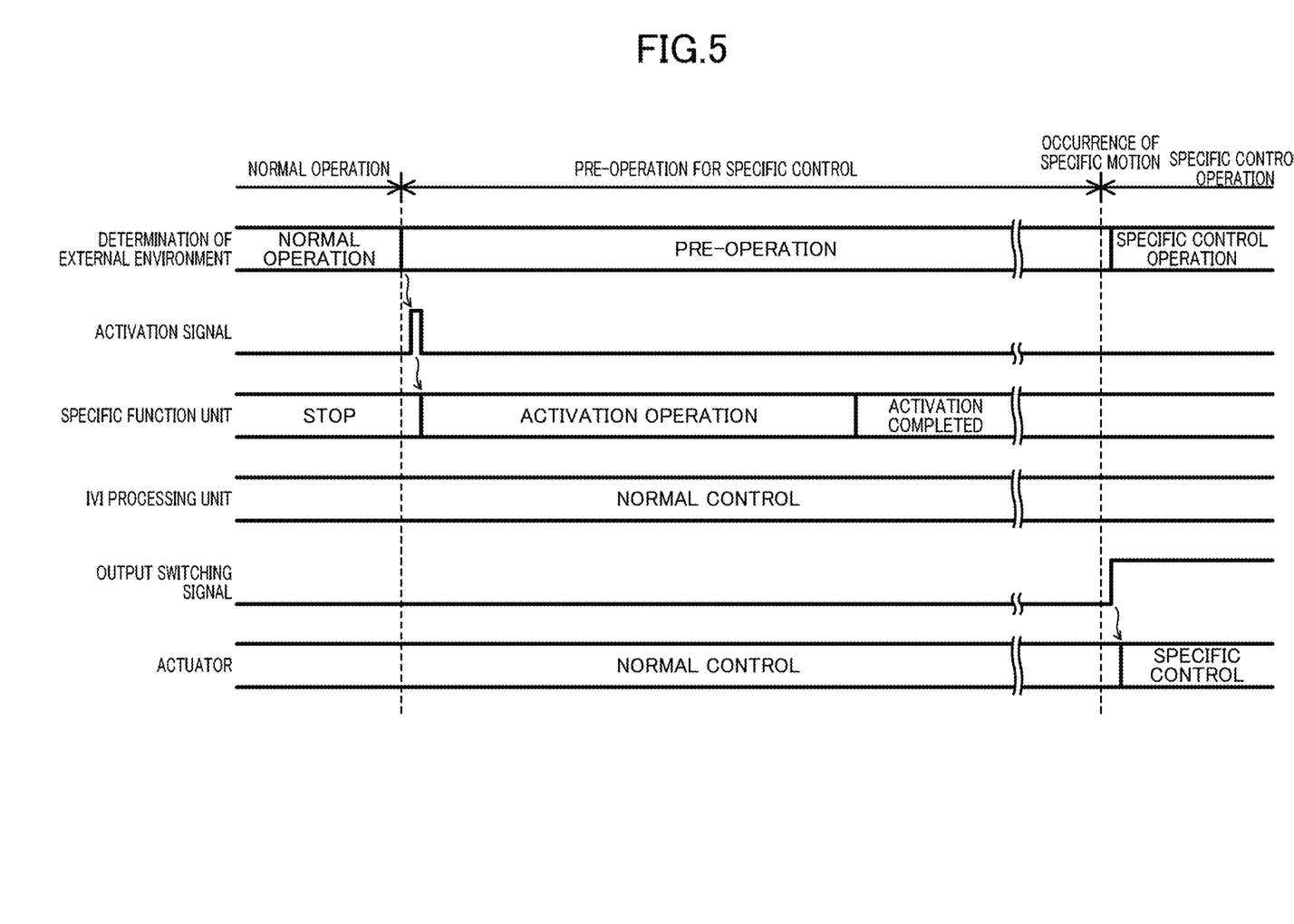
FIG. 5 is a timing chart showing an operation of the device according to the variation.

Further, in the above-described embodiment, the vehicle information display device that displays an image captured by the rear-view camera 21c has been described, but the invention of the present disclosure may also be applied to other devices. For example, FIG. 4 schematically shows a configuration of a device (hereinafter, referred to as a "vehicle control device 130") according to a variation of the embodiment. In FIG. 4, components that are common with those shown in FIG. 1 are denoted by the same reference numerals, and may not be described. In FIG. 4, the configurations of the sensor device 20 and the external communication unit 30, and the configurations of the external environment recognition unit 111, the vehicle behavior estimation unit 113, the occupant behavior estimation unit 114, and the environment determination unit 115 are the same as those in FIG. 1, and detailed descriptions thereof will be omitted. A selector 134 has a configuration corresponding to that of the selector 123. The selector 134 selects either one of a change parameter setting unit 131 or a parameter setting unit 132, based on the determination result from the environment determination unit 115, and outputs the selected one to the control unit 50 corresponding to the image display device 40.

In FIG. 4, the vehicle control device 130 includes the parameter setting unit 132 and the change parameter setting unit 131. The parameter setting unit 132 receives outputs from the external environment recognition unit 111, the vehicle behavior estimation unit 113, and the occupant behavior estimation unit 114, and sets parameters of a control unit 50. The change parameter setting unit 131 sets a change parameter for changing a parameter of the control unit 50. Further, the vehicle control device 130 includes two selectors 133 and 134 that receive outputs from the parameter setting unit 132 and the parameter setting unit 131, select either one of the outputs, and output the selected one. The selector 133 selects either one of the parameter or the change parameter based on the output switching signal from the environment determination unit 115, and outputs the selected one to the sensor device 20. Similarly, the selector 134 selects either one of the parameter or the change parameter based on the output switching signal from the environment determination unit 115, and outputs the selected one to the control unit 50. The control unit 50 is an unit for controlling devices such as actuators and sensors which are controlled when a motor vehicle travels, and functions particularly to control actuators related to driving, braking, and steering of the vehicle 1. That is, the selector 134 outputs a parameter for controlling devices such as the actuators and the sensors. Note that the output switching signal may be output from at least either one of the sensor device 20 or the external communication unit 30.

Similarly to the image processing unit 121 of the first embodiment, the change parameter setting unit 131 prepares a change parameter for changing the setting of the sensor device 20 and/or the control unit 50 based on the output from the environment determination unit 115.

For example, when the environment determination unit 115 determines, based on the output result from the vehicle status sensor 24, that the vehicle is traveling at a sufficiently low speed, the change parameter setting unit 131 prepares in advance the change parameter based on setting information or the like stored in advance in a database DB and the like. For example, a change parameter for lowering the accelerator sensitivity than in the state in which the vehicle is traveling at a normal speed is prepared. The driver can finely adjust the accelerator operation by lowering the accelerator sensitivity to be lower than that in the state in which the vehicle is traveling at the normal speed. When the driver performs a specific motion or operation, the sensor device 20 outputs an output switching signal, and the change parameter is reflected. For example, for the adjustment of the accelerator sensitivity, if the driver performs a predetermined preliminary motion that is a precondition for the "specific motion," the environment determination unit determines that an occurrence of the "specific motion" is predicted, and prepares the change parameter. Further, when the driver actually performs the "specific motion", the selectors 133 and 134 may be switched, and the setting parameter may be reflected in the device.

As described above, the vehicle control device 130 includes the environment determination unit 115 that predicts an occurrence of a specific motion of the vehicle based on the output from the sensor device 20 that acquires environment information of at least either one of the inside or outside of the vehicle. When the environment determination unit 115 predicts an occurrence of a specific motion, the setting parameter of the device to be operated in accordance with the specific motion is prepared in advance, and when the user performs a motion indicating the specific motion, the setting parameter is reflected in the control unit 50.

As described above, the setting parameter of the device to be operated in accordance with the specific motion is prepared in advance. Thus, the setting parameter is allowed to be promptly reflected in the control unit 50 when the user performs a motion indicating the specific operation.

Note that as the setting parameter, the number of cylinders to be moved in the engine may be changed depending on the traveling scene, for example. Further, the setting parameter is not limited to the setting parameter of the device, and a parameter for arithmetic processing such as the size and/or the resolution of the map of the vehicle's external environment created by the autonomous driving system may be changed based on the traveling scene, for example.

Further, the vehicle control device 130 includes the environment determination unit 115 that predicts an occurrence of the specific motion of the vehicle based on the output from the sensor device 20 that acquires environment information of at least either one of the inside or outside of the vehicle. The parameter suitable for the environment may be set using the determination result from the environment determination unit 115, without the user's motion indicating a specific motion as a precondition.

INDUSTRIAL APPLICABILITY

The technology disclosed herein is useful as an external environment recognition device that recognizes an external environment of an autonomous mobile object.

The invention claimed is:
1. A vehicle information display device that displays, on an in-vehicle display, an image captured by a rear-view camera that captures an image of an outside area behind a vehicle, the vehicle information display device comprising:
an image processing circuit that receives data of the image captured by the rear-view camera and performs predetermined image processing on the data of the image;
a display switching circuit that switches a display of a monitor screen provided in a vehicle, in accordance with an output from a driving operation information circuit that detects a position of a shift lever; and
an environment determination circuit that predicts an occurrence of a backward movement of the vehicle, based on one or more of an output from a front-view camera that captures an image of an outside area ahead of the vehicle, an output from a vehicle speed sensor, and an output from an in-vehicle camera that captures an image of a driver, wherein when the environment determination circuit predicts an occurrence of a backward movement of the vehicle, the rear-view camera is switched from a stopped state to an activated state, in a case where the driving operation information circuit has detected that the shift lever is at a position other than the reverse position, and the image processing circuit starts the predetermined image processing on the data of the image received from the rear-view camera in the activated state, and the image processing circuit is set to be ready for outputting an image captured by the rear-view camera to the display switching circuit, and
when the display switching circuit receives, from the driving operation information circuit, a movement signal indicating that the shift lever has been moved to a reverse position, the display switching circuit switches the display of the monitor screen provided in the vehicle to an output image from the image processing circuit.

2. The vehicle information display device of claim 1, wherein
the environment determination circuit predicts an occurrence of a backward movement of the vehicle when recognizing entering of the vehicle into a parking lot, based on an output from an external environment recognition circuit including the front-view camera.

3. The vehicle information display device of claim 2, wherein
the environment determination circuit predicts an occurrence of the backward movement of the vehicle when recognizing brief stop of the vehicle based on the output from the vehicle speed sensor and recognizing a motion of the driver looking behind after the brief stop by the in-vehicle camera.

4. The vehicle information display device of claim 1, wherein
the environment determination circuit predicts an occurrence of the backward movement of the vehicle when recognizing brief stop of the vehicle based on the output from the vehicle speed sensor and recognizing a motion of the driver looking behind after the brief stop by the in-vehicle camera.

5. A vehicle information display device comprising:
an image processing circuit that receives data of an image captured by a rear-view camera that captures the image of an outside area behind a vehicle, and performs predetermined image processing on the data of the image; and
an environment determination circuit that predicts an occurrence of a backward movement of the vehicle, by recognizing a brief stop of the vehicle based on an output from a vehicle speed sensor and by recognizing a motion of a driver looking behind after the brief stop based on an output from an in-vehicle camera that captures an image of the driver, wherein
when the environment determination circuit predicts an occurrence of a backward movement of the vehicle, a setting of the rear-view camera is changed from a rear monitoring setting for monitoring a rear of the vehicle during normal traveling of the vehicle to a backward movement setting having a high-definition imaging distance shorter than that of the rear monitoring setting.

6. A non-transitory computer readable storage device having computer readable instructions that when executed by circuitry cause the circuitry to:
receive data of an image captured by a rear-view camera that captures the image of an outside area behind a vehicle, and performs predetermined image processing on the data of the image;
predict an occurrence of a backward movement of the vehicle by recognizing a brief stop of the vehicle based on an output from a vehicle speed sensor and by recognizing a motion of a driver looking behind after the brief stop based on an output from an in-vehicle camera that captures an image of the driver; and
when an occurrence of a backward movement of the vehicle is predicted, setting of the rear-view camera is changed from a rear monitoring setting for monitoring a rear of the vehicle during normal traveling of the vehicle to a backward movement setting having a high-definition imaging distance shorter than that of the rear monitoring setting.

* * * * *